Jan. 5, 1960 J. Z. DE LOREAN 2,919,604
TRANSMISSION
Filed July 26, 1957 3 Sheets-Sheet 1
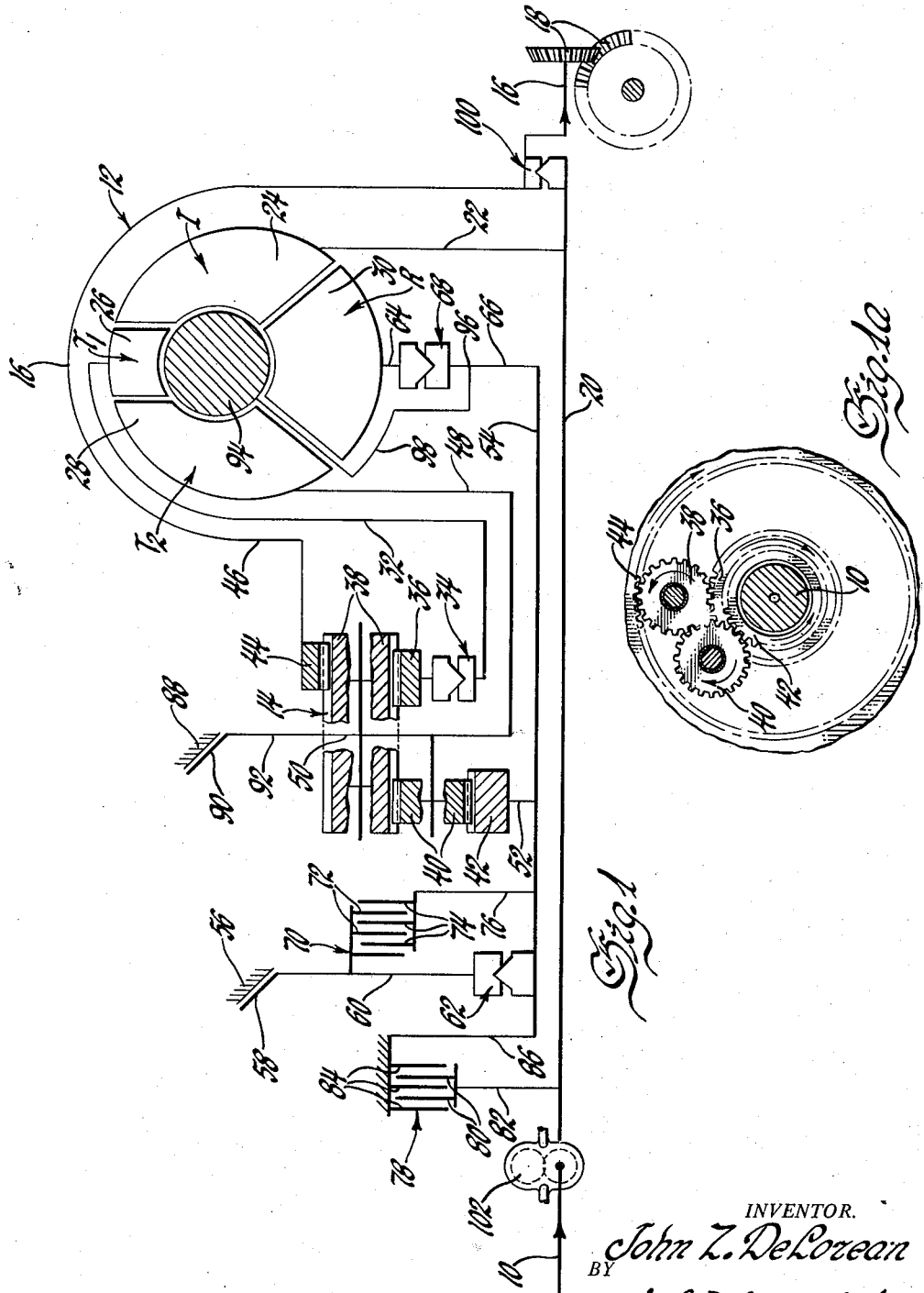
INVENTOR.
John Z. DeLorean
BY
W. C. Middleton
ATTORNEY

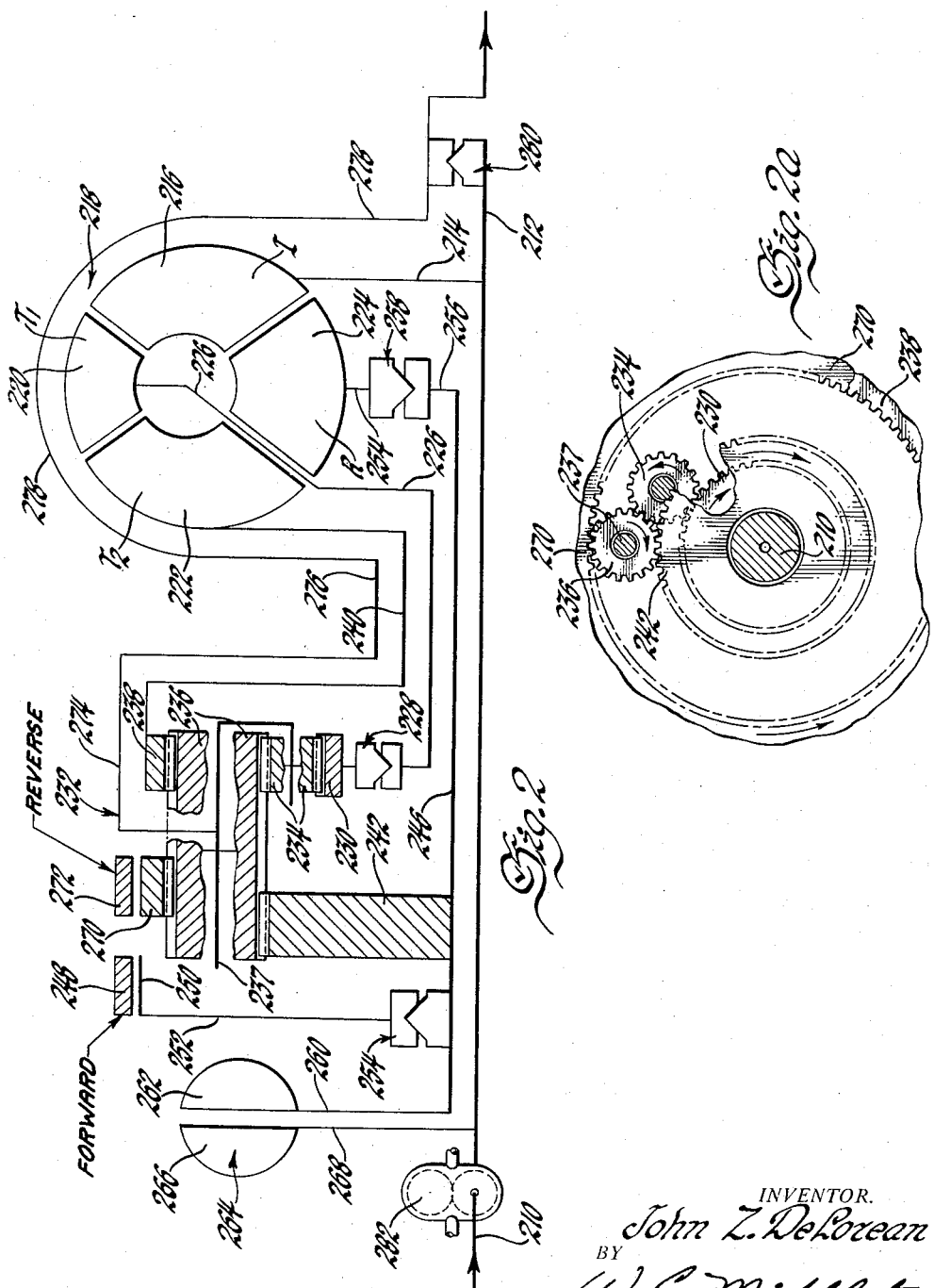

Jan. 5, 1960
J. Z. DE LOREAN
2,919,604
TRANSMISSION
Filed July 26, 1957
3 Sheets-Sheet 3
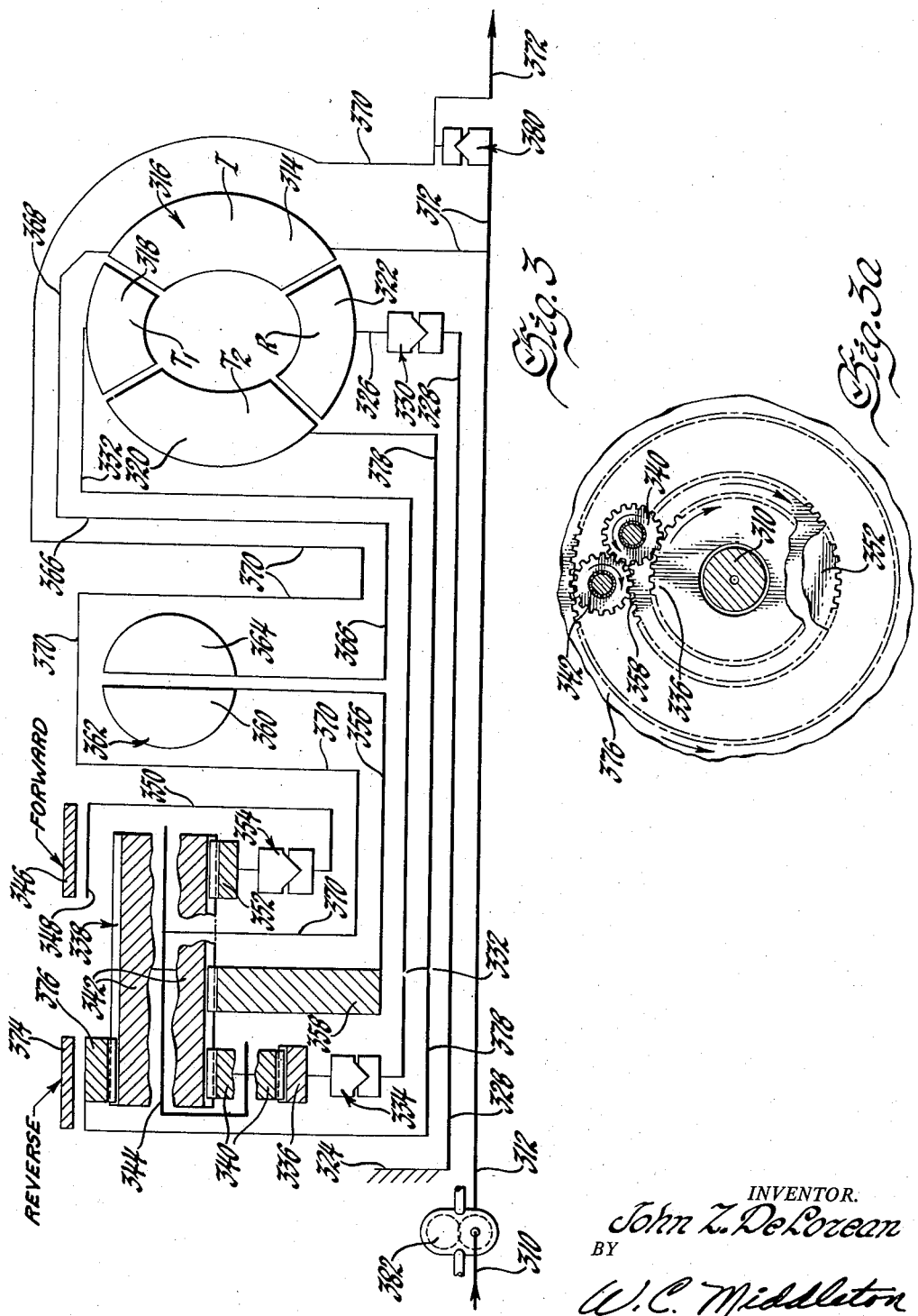
INVENTOR.
John Z. DeLorean
BY
W. C. Middleton
ATTORNEY

United States Patent Office 2,919,604
Patented Jan. 5, 1960

2,919,604

TRANSMISSION

John Z. De Lorean, Birmingham, Mich., assignor to General Motors Corporation, Detroit, Mich., a corporation of Delaware Application July 26, 1957, Serial No. 674,524

5 Claims. (Cl. 74—677)

This application relates to an automatic transmission of the torque converter-planetary gear type.

An object of this invention is to provide a transmission mounted adjacent the rear axle of a motor vehicle and consisting of a torque converter combined with planetary gearing to provide a reduction forward drive, with a high forward speed drive being established by an inertia balanced final upshift.

It is also an object of this invention to provide a transmission having a torque converter combined with planetary gearing wherein the planetary gearing consists of a compound gear set having means providing a low forward speed ratio and a high or substantially direct drive ratio by the operation of a fluid coupling of the fill and empty type.

It is a further object of this invention to provide a transmission having a torque converter in combination with a compound planetary gear set, the gear set being substantially locked up to provide approximately a direct drive by means of filling a fluid coupling of the fill and empty type.

Other features, advantages and objects will become apparent by reference to the detailed description of the invention and to the drawings wherein:

Figure 1 is a schematic illustration of a transmission embodying this invention, Figure 1A is a cross-sectional view of the gearing of Figure 1, Figure 2 is a modification of the transmission of Figure 1, Figure 2A is a cross-sectional view of the gearing of Figure 2, Figure 3 is a modification of the transmission of Figure 2, and Figure 3A is a cross-sectional view of the gearing of Figure 3.

Referring now to the drawings and more particularly to Figures 1 and 1A, there is shown therein a drive or input shaft 10 adapted to drive a torque converter 12 connected to a gear set 14 for driving an output shaft 16 connected by gearing 18 to the rear axle for the wheels to be driven.

Input shaft 10, which may be driven by any suitable source of power, such as an internal combustion engine (not shown), is drivingly connected by means of input shaft extensions 20 and 22 to the rotatable pump element 24 of torque converter 12 having a first rotatable turbine element 26, a second rotatable turbine element 28 and a stator element 30.

The blades of the torque converter 12 are designed of a shape such that fluid leaving forwardly rotating pump element 24 strikes the blades of the first turbine 26 in a manner to rotate it in a forward direction, the fluid in turn leaving turbine 26 and striking turbine 28 to also rotate it forwardly. Fluid leaving the second turbine 28 enters the stator in such a direction as to initially at low pump speeds attempt to rotate the stator 30 in a reverse direction, such reverse rotation being normally prevented by means to be described hereinafter. At higher pump speeds, fluid leaving second turbine 28 strikes stator 30 at a more favorable angle to cause the stator to rotate forwardly.

Connected to first turbine 26 by means of drive connection 32 and one-way device 34 is the first sun gear member 36 of a compound planetary gear set 14 having a plurality of relatively long planet pinions 38 meshing with sun gear 36 and a second set of relatively short planet pinions 40 which in turn mesh with a second sun gear 42. Also meshing with long pinions 38 is a ring gear 44 being connected to the output shaft 16 by means of connection 46 rotatably surrounding and enclosing the torque converter 12 to act as a housing for the torque converter.

The one-way device 34 is constructed to engage to connect first turbine 26 and sun gear 36 upon faster rotation in a forward direction of turbine 26 relative to the sun gear, while permitting overrun or overtravel of the sun gear in the same direction with respect to said turbine. Connected to the second turbine 28 by means of drive connection 48 is the carrier member 50 for the gear set 14 rotatably supporting the intermeshing planet pinions 38 and 40.

The sun gear 42 is shown having a connection 52 with a sleeve shaft 54 for holding the sun gear stationary in one or both directions of rotation to cause sun gear 42 to act as a reaction member for the gear set. A brake means 56 is provided for this purpose and is adapted to be engaged with a brake surface 58 fastened to a connecting member 60 connected to sleeve shaft 54 by means of a one-way device 62, the one-way device preventing reverse rotation of the sun gear 42 with respect to the brake 56 while permitting overrun or overtravel in a forward direction with respect thereto.

Stator 30 is also adapted to be connected to sleeve shaft 54 by means of drive connections 64, 66 and one-way device 68, the one-way device 68 preventing reverse rotation of stator 30 with respect to sleeve shaft 54 while permitting overtravel or overrun of the stator in a forward direction relative thereto.

Also shown connected between the brake connection 60 and sleeve shaft 54 by-passing the one-way device 62 is a coast brake 70 having a plurality of friction disks 72 splined to an extension of connection 60 and mating with friction disks 74 splined on a connection 76 to sleeve shaft 54. Engagement of the coast brake 70 causes sun gear 42 and sleeve shaft 54 to be held stationary in both directions of rotation, thereby providing a permanent reduction drive through the gear set 14 to retard overrun of the output shaft 16 with respect to the input shaft 10.

A high speed friction disk clutch 78 is provided having a plurality of friction disks 80 splined on an extension 82 of the input shaft 10 and mating with a plurality of friction disks 84 splined on a further extension 86 of sleeve shaft 54. This high speed clutch is for the purpose of connecting sun gear 42 to rotate with input shaft 10 at a time when the first and second turbine members 26 and 28, respectively, are rotating at approximately the speed of pump element 24, thereby providing a dual drive to the gear set at approximately the same speed to substantially lock-up the gear set therefore driving output shaft 16 at approximately the speed of input shaft 10. The speed differential between these two shafts is due to the inherent slip present in the hydraulic torque converter.

In a transmission of this kind, wherein a clutch is engaged to inaugurate a shift in the gearing connections for providing the highest speed drive, it is very desirable that this shift be made with the minimum amount of shock or jerk, which would be noticeable and undesirable to the vehicle operator.

Therefore, suitably positioned within the inner fluid chamber formed by the radially inner portions of the torque converter elements is a weight 94 connected to the extension 66 of the sleeve shaft 54 at 96 by drive means 98 extending between the second turbine 32 and stator 30. The purpose of weight 94 is to provide sun gear 42 and its connections with such a mass that when the sun gear is accelerated by engagement of clutch 78, its accelerated inertia will be balanced with the decelerated inertia of the rotating pump mass and its connections, since a substantially direct drive is being established with the sun gear 42 accelerating from rest and the pump or input shaft decelerating down to output shaft speed. The operation of weight 94 and its function will be described more in detail hereinafter in connection with the operation of the transmission.

Also provided is a second brake means 88 adapted to be engaged with the brake face member 90 of an extension 92 of the carrier 50, this second brake means 88 being provided for the purpose of establishing a reverse drive through the transmission as will be explained hereinafter under the operational phases.

Releasably connecting the input shaft 10 and output shaft 16 is another one-way device 100 disengaging upon overrun or overtravel of the input shaft 10 with respect to output shaft 16, while engaging to permit output shaft 16 to drive input shaft 10, such as when a push start of the vehicle is desired. For this reason, a driven shaft pump is unnecessary, and only a fluid pump 102 is provided fixed to the input shaft 10 for supplying the necessary fluid pressure for the filling and operating of the torque converter 12, the clutch 78 and brakes 56, 70 and 88.

OPERATION

Neutral

Upon disengagement of brakes 56, 70, 88, and clutch 78, no drive will be transmitted from input shaft 10 to output shaft 16 since no reaction member is provided for the gear set 14 and the gear set merely idles freely without transmitting torque from the torque converter to the output shaft.

Forward

Upon engagement of brake 56 with face 58 by fluid from pump 102 through suitable conduits (not shown), and upon forward rotation of input shaft 10 in a clockwise direction as seen in Figure 1A, pump element 24 will be rotated forwardly thereby rotating turbine 26 forwardly to drive sun gear 36 through one-way device 34. Rotation of sun gear 36 will cause long pinions 38 to be rotated counterclockwise to rotate short pinions 40 clockwise to attempt to rotate sun gear 42 counterclockwise, this latter counterclockwise rotation being prevented by the engagement of one-day device 62 thereby holding sun gear 42 stationary in this direction of rotation. Since sun gear 42 now acts as a reaction member, the carrier 50 will be caused to walk around or planetate about sun gear 42 thereby causing ring gear 44 to be driven forwardly at a reduced speed to drive output shaft 16 forwardly and at a speed reduced from that of the input shaft speed. At this time, the second turbine 28 is beginning to rotate and the stator 30 is held from reverse rotation by the engagement of one-way device 68.

Upon further increase in speed of pump 24, the second turbine 28 will increase in speed sufficiently to drive the carrier 50 faster than it is being driven by first turbine 26 through sun gear 36. Thereafter, turbine 28 becomes the primary driving member and sun gear 36 is rotated at an overdrive ratio in a forward direction, such rotation being permitted by the releasing of one-way device 34. At this time, sun gear 42 is still attempting to rotate in a reverse direction and continues to act as a reaction member to provide a drive to the output shaft 16 at a faster speed ratio, such faster ratio still being at a speed lower than the speed of rotation of the input shaft 10. Upon still further increase in speed of rotation of the pump 24, the second turbine 29 and thus carrier 50 will be rotating at a speed sufficient to cause sun gear 42 to reverse its direction of rotation and begin to rotate in a forward direction. At this time, it is desirable to engage the high speed clutch 78 to clutch the sun gear 42 to the input shaft 10. Since the second turbine 28 is rotating substantially at the speed of pump 24, and sun gear 42 is rotating at input shaft speed, the gear set 14 will be substantially locked up to provide approximately a direct drive from the input shaft 10 to the output shaft 16.

The smoothness of engagement of clutch 78 is important with respect to wear of the plates and feel to the operator as mentioned previously. In the engagement of this clutch, the output shaft speed remains substantially the same while the input shaft speed is decelerated and the speed of the reaction member 42 is brought from rest to the speed of the input shaft. Therefore, the weight 94 attached to the sun gear sleeve shaft 54 is of such a size that upon accelerating this mass from rest an inertia is developed sufficient to balance the decreasing inertia caused by the decelerating masses of the pump 24 and its connections to the input shaft along with the masses of the second turbine 28 and its connections to the carrier 50. Thus, a balanced inertia upshift is accomplished whereby the accelerating inertia balances the decelerating inertia to effect a smooth shift thereby permitting the clutch 78 to be engaged without "feel" to the operator.

Reverse

Upon engagement of brake 88 with brake face 90 to hold the carrier 50 and second turbine 28 stationary to act as a reaction member, and with release of brakes 56, 70 and clutch 78, forward rotation of input shaft 10 and pump 24 drives turbine 26 in a forward direction to rotate sun gear 36 through one-way device 34 in a forward or clockwise direction. Since carrier 50 is stationary, pinions 38 will be rotated counterclockwise to rotate ring gear 44 counterclockwise and thus drive output shaft 16 in a reverse direction and at a speed reduced from that of the speed of input shaft 10.

Coast braking

Upon application of brakes 56, 58, and coast brake 70, with release of brakes 88, 90, and clutch 78, sun gear 42 will be held stationary in both directions of rotation. Therefore a permanent reduction drive is established in the gear set 14 and overrun of output shaft 16 with respect to input shaft 10 is retarded through the gear set 14 in addition to the action of the one-way device 100 which will engage at this time.

Referring now to Figures 2 and 2A, there is shown therein a modification of the transmission of Figure 1. An input shaft 210 drives an extension sleeve shaft 212 and 214 to rotate the pump element 216 of a torque converter 218 having a first rotatable turbine 220, a second rotatable turbine 222 and a stator 224. Connected to first turbine 220 by means of drive connections 226 and a one-way device 228 is a first rotatable sun gear member 230 of a planetary gear set 232 having a plurality of relatively short planet pinions 234 meshing with sun gear 230 and with a plurality of relatively long planet pinions 236, said pinions being rotatably supported upon a carrier 237 having an extension 274 drivingly connected by means of a shaft 276 to the output or driven shaft 278 rotatably surrounding and enclosing the torque converter 218. The one-way device 228 is engaged by faster forward rotation of the first turbine 220 relative to sun gear 230, while being disengaged upon overrun or overtravel of the sun gear relative to the turbine.

Meshing with long pinions 236 is a first ring gear 238 having a drive connection 240 with the second turbine 222, a second sun gear 242 fixed to a sleeve shaft 246, and a second ring gear 270 adapted to cooperate with a brake element 272. A brake 248 cooperating with a brake element 250 on a drive connection 252 is adapted to control rotation of sleeve shaft 246 through the action of a one-way device 254, this device preventing reverse rotation of shaft 246 with respect to the direction of rotation of pump 216, while permitting overrun or overtravel of sleeve shaft 246 in a forward direction relative thereto. Also connected to sleeve shaft 246 by means of drive connections 254, 256 and one-way device 258 is the stator 224, the one-way device 258 preventing reverse rotation of the stator 224 relative to shaft 246 while permitting overrun or overtravel of said stator in a forward direction.

Connected to an extension 260 of sleeve shaft 246 is the turbine member 262 of a fluid coupling 264 having a cooperating pump element 266 fixed to an extension 268 of the input shaft 210. This fluid coupling is of the "fill and empty" type wherein suitable controls may be provided to selectively cause its operation by filling and emptying the same.

Input or drive shaft 210 is adapted to be connected to the driven or output shaft 278 by means of a one-way device 280, the one-way device disengaging to permit overrun or overtravel of the input shaft 210 in a forward direction with respect to the rotation of output shaft 278, while engaging to permit the driving of input shaft 210 by the output shaft 278 in the same manner as described in connection with Fig. 1.

OPERATION

Neutral

Upon disengagement of brakes 248 and 272 and emptying of coupling 264, no drive will be transmitted from input shaft 210 to output shaft 278 through the transmission since no reaction member is provided for the gear set, the gear set merely idling freely.

Forward

Upon rotation of input shaft 210 in a forward or clockwise direction as seen looking at the transmission from the input shaft end, and upon application of brake 248 by fluid pressure from an input shaft pump 282 through suitable conduits (not shown), pump 216 will be rotated to rotate first turbine element 220 forwardly. Forward rotation of first turbine 220 will cause one-way device 228 to engage to rotate sun gear 230 clockwise as seen in Figure 2A to rotate short pinions 234 counterclockwise, long pinions 236 clockwise, and attempt to rotate sun gear 242 counterclockwise, such reverse or counterclockwise rotation of sun gear 242 being prevented by engagement of one-way device 254 to hold the sun gear stationary. Since sun gear 252 now acts as a reaction member, the carrier 237 will be caused to planetate about the stationary sun gear and drive the extension 274 and output shaft 278 forwardly at a speed reduced from the speed of input shaft 210. At this time, turbine 222 will rotate attempting to rotate stator 224 in a counterclockwise or reverse direction, such reverse direction being prevented by engagement of the one-way device 258 to hold the stator stationary.

Upon increased rotation of pump 216, the second turbine 222 will increase in speed sufficiently to drive the ring gear 238 forwardly at a faster rate, thereby through the long pinion 236 driving the carrier 238 forwardly at a faster rate than previously. The short pinion 234 will then be driven faster in a counterclockwise direction to drive the first sun gear 230 at approximately an overdrive ratio, such rotation being permitted by the disengagement of the one-way device 228. Thus, at increased speeds of rotation of the pump 216, the second turbine 222 becomes the driver replacing the first turbine 220, which will rotate freely without contributing driving torque to the gear set.

At a sufficient increased rotation of the second turbine 222, the second sun gear 242 will begin to rotate clockwise or forwardly which is permitted by disengagement of the one-way device 254. At this time, filling of the coupling 264 may be accomplished to connect the second sun gear 242 and the input shaft 210. With the coupling 264 filled, and with the second turbine 222 rotating at approximately the speed of pump 216 to rotate ring gear 238 at approximately the same speed, the gear set 232 will be substantially "locked up" to provide approximately a direct drive between the input shaft 210 and the output shaft 278. The speed differential between these two shafts will be caused because of the inherent slip in the torque converter.

Reverse

Upon application of brake 272 to hold ring gear 270 stationary, and upon disengagement of brake 248 and the emptying of coupling 264, ring gear 270 will act as a reaction member to provide a reverse drive through the transmission. Since both the ring gears 270 and 238 are in mesh with the long pinion 236, the second turbine 222 will also be held stationary. Upon rotation of pump 216 forwardly to rotate the first turbine 220 forwardly or clockwise, one-way device 228 will engage to rotate sun gear 230 clockwise, rotating short pinions 234 counterclockwise, and long pinions 236 clockwise to attempt to rotate ring gear 270 clockwise. With ring gear 170 stationary, the carrier 274 will be caused to planetate about the stationary ring gear in a counterclockwise or reverse direction, thereby providing a reduction drive to the output shaft 278 in a direction opposite to the direction of rotation of input shaft 210.

Referring now to Figures 3 and 3A, there is shown therein a modification of the transmission of Figures 2 and 2A. An input shaft 310 has an extension 312 drivingly connected to the pump 314 of a torque converter 316 having a first turbine 318, a second turbine 320 and a stator 322, the stator being connected to the casing at 324 by drive connections 326, 328 and a one-way device 330. The one-way device 330 prevents reverse or counterclockwise rotation of stator 322 with respect to the clockwise or forward rotation of pump 314, while permitting overrun or overtravel of the stator in a clockwise direction relative thereto.

Connected to first turbine 318 by means of a drive connection 332 and a one-way device 334 is the first sun gear 336 of a planetary gear set 338. As in the previous modifications, one-way device 334 is engaged upon faster forward or clockwise rotation of the first turbine with respect to the sun gear 336 while being disengaged to permit overrun or overtravel of the sun gear with respect to the turbine. Meshing with said sun gear 336 is a relatively short pinion 340 which in turn meshes with a relatively long pinion 342, said planet pinions being rotatably mounted and supported upon a carrier 344.

A brake means 346 adapted to cooperate with a brake face 348 on a connection 350 is connected to a second sun gear 352 by means of a one-way device 354, second sun gear 352 meshing with the long pinion 342. The one-way device 354 prevents reverse or counterclockwise rotation of sun gear 352 with respect to brake 346, while permitting overrun or overtravel of the sun gear relative thereto.

Suitably connected by a sleeve shaft 356 to a third sun gear 358 meshing also with said long pinion 342 is the turbine element 360 of a fluid coupling 362 having a pump or impeller element 364 connected by drive connection 366 to an extension 368 of the pump 314. This coupling is adapted to be of the fluid fill and empty type wherein means may be provided to selectively cause filling of the same to drive the third sun gear 358 at the speed of pump 314. Rotatably surrounding and enclosing the fluid coupling 362 is an extension 370 of the carrier 344 being formed integrally with the output shaft 372 rotatably surrounding and enclosing the torque converter 316.

Also provided is a second brake means 374 cooperating with a second ring gear 376 connected to the second turbine 320 by a sleeve shaft 378.

Connecting the input shaft 310 and output shaft 372 is a one-way device 380 permitting overrun of the input shaft 310 in a clockwise or forward direction with respect to the output shaft 372, while permitting driving of the input shaft 310 by the output shaft 372 to effect engine braking or a push start of a stalled vehicle. For this reason, a driven shaft fluid pump is unnecessary and only a fluid pump 382 is provided fixed to the input shaft 310 for furnishing the fluid pressure necessary for actuation of the brakes 346 and 374 and filling of the coupling 362 and the torque converter 316.

OPERATION

Neutral

Upon disengagement of the brakes 374, 346 and emptying of the coupling 362, no drive will be transmitted from the input shaft 310 to the output shaft 372 due to the lack of a reaction member for the gear set 338, and the gear set will merely idle freely.

Forward

Upon engagement of brake 346 by fluid pressure from pump 382, and upon rotation of input shaft 310 in a clockwise or forward direction as seen in Figure 3A, pump 314 will be rotated forwardly to rotate first turbine 318 to drive the first sun gear 336 forwardly through the one-way engaged device 334. Rotation of the first sun gear 336 forwardly or clockwise will rotate the first short planet pinions 340 counterclockwise, the long pinions 338 clockwise to attempt to rotate the second sun gear 352 counterclockwise, such counterclockwise or reverse rotation being prevented by engagement of the one-way device 354. Thus, sun gear 352 acts as a reaction member and a reduction drive is established through the gear set 338 thus causing the carrier 344 and its extension 370 to be rotated forwardly or clockwise thereby rotating the output shaft 372 in a forward direction and at a speed reduced from the speed of input shaft 310. Upon further increase in speed of pump 314, the second turbine 320 will cause rotation of ring gear 376 to rotate carrier 344 faster in a forward or clockwise direction thereby driving the output shaft 372 at a higher speed ratio in a forward direction. At this time, sun gears 352 and 358 will be driven at an overdrive ratio, the one-way device 354 disengaging to permit this rotation by the sun gear 352. Upon faster rotation of pump 314, a point will be reached wherein the second turbine 320 will be rotating at approximately the speed of pump 314. Filling of the coupling 362 is now begun thereby causing the sun gear 358 to rotate at the speed of pump 316. With the coupling 362 filled, ring gear 376 and sun gear 358 will both be rotating at approximately the same speed to substantially "lock-up" the gear set and drive the output shaft 372 at approximately the speed of input shaft 310, the speed differential being due to the inherent slip present in the torque converter 316 and fluid coupling 362.

Reverse

Upon application of brake 374 to hold ring gear 376 stationary, with release of the other brake 346 and emptying of the coupling 362, rotation of pump 314 in a clockwise or forward direction will rotate first turbine 318 and sun gear 336 clockwise, rotating short pinions 340 counterclockwise, and rotating long pinions 344 clockwise. With ring gear 376 stationary, the carrier 344 will be caused to planetate about the ring gear 376 in a counterclockwise or reverse direction thereby driving the output shaft 372 in a direction opposite to the direction of rotation of input shaft 310 and at a speed reduced therefrom. It is to be noted also that the second turbine 320 is held stationary by its connection with the ring gear 376, thereby causing the fluid leaving the second turbine to always strike the stator 322 to attempt to rotate it in a counterclockwise or reverse direction, such rotation being prevented by the engagement of the one-way device 330. Therefore, the torque converter during reverse will always act for the conversion of torque.

From the foregoing it will be seen that applicant has provided a transmission mounted adjacent the rear axle and consisting of a plural-turbine torque converter in combination with a compound planetary gear set wherein a high speed drive is accomplished by the means of a clutch or fill and empty fluid coupling. It will also be seen that applicant has provided a transmission of the torque converter planetary gear type having a balanced inertia final upshift in the gear set. It will further be seen that applicant has provided a rear axle mounted transmission that is economical to manufacture, simple in design with ease of disassembly for repair. It will be understood that the invention can be modified beyond the illustrated embodiments, and therefore, any limitations to be imposed are those set forth in the following claims.

I claim:

1. A transmission comprising an input shaft, an output shaft, and means connecting said shafts, said means comprising a hydrodynamic drive device and gear means, said drive device including a rotatable input element connected to said input shaft and a plurality of output elements, said gear means comprising a planetary gear set having a plurality of sun gears, a ring gear and a plurality of intermeshing planet pinions meshing with said ring and sun gears, a carrier rotatably supporting said planet pinions, means drivingly connecting one of said output elements and one of said sun gear members, means connecting another of said output elements and the carrier of said gear set, means connecting said ring gear and said output shaft, said latter means rotatably surrounding and enclosing said drive device, brake means for another of said sun gears for providing a reduction through said gear set, and clutch means connecting said last-named sun gear and said input shaft for substantially locking up said gear set to provide approximately a direct drive from said input shaft to said output shaft.

2. A transmission comprising an input shaft, an output shaft, and means connecting said shafts, said means comprising a hydrodynamic drive device and gear means, said drive device including a pump element rotatable with said input shaft and a plurality of rotatable turbine elements, said gear means comprising a planetary gear set having a plurality of input members, a reaction member and an output member, means connecting said input members and said turbine elements, brake means for said reaction member, and clutch means connecting said reaction member and said input shaft for substantially locking up said gear set, said clutch means when engaged causing acceleration of said reaction member with deceleration of said pump element, said reaction member and said pump element and the connections thereto having masses such that upon the engagement of said clutch means the accelerated inertia of said reaction member is balanced by the decelerated inertia of said pump element.

3. A transmission for transmitting torque from a drive shaft to a driven shaft including a hydrodynamic torque converter and a planetary gearing unit, said converter including an impeller driven by said drive shaft, first and second turbines and a reaction member forming a path for circulating working fluid forming an eye therein, a rotatable weight disposed in said eye, said planetary gearing unit including a planet carrier supporting first and second planet pinions in mesh with each other, a sun gear in mesh with said first planet pinion and driven by said first turbine, a ring gear in mesh with said first planet pinion and connected to drive said driven shaft, a drive connection between said carrier and said second turbine, an engageable and releasable brake effective when engaged to brake said planet carrier and said second turbine against rotation to establish reverse drive of said driven shaft, a second sun gear in mesh with said second planet pinion, a rotatable sleeve shaft fixed to said rotatable weight and to said second sun gear, a one-way brake and an engageable and releasable brake connected in series effective when said engageable and releasable brake is engaged to prevent reverse rotation of said sleeve shaft, said second sun gear and said rotatable weight, a one-way brake between said reaction member and said sleeve shaft for preventing reverse rotation of said reaction member with respect to said sleeve shaft, and an engageable and releasable clutch effective when engaged to clutch said sleeve shaft to said drive shaft.

4. A transmission for transmitting torque from an input shaft to an output shaft including in combination, a hydrodynamic drive device and a planetary gearing unit, said drive device including an impeller driven by said input shaft and first and second turbines, said gear unit including a planet carrier supporting first and second planet pinions in mesh with each other, a sun gear in mesh with said first planet pinion and driven by said first turbine, a ring gear in mesh with said first planet pinion and connected to drive said output shaft, means connecting said planet carrier to said second turbine, a reaction sun gear in mesh with said second planet pinion, an engageable and releasable reverse brake effective when engaged to prevent rotation of said planet carrier and said second turbine to establish reverse drive of said output shaft, brake means including an engageable and releasable forward brake and a one-way brake connected in series for preventing rotation of said reaction sun gear in one direction to establish reduction drive through said gearing unit, an engageable and releasable clutch effective when engaged to clutch said reaction sun gear to said input shaft to establish direct drive through said gearing unit, and a one-way clutch between said input shaft and said output shaft constructed and arranged to permit said input shaft to rotate faster than said output shaft and to prevent said output shaft from rotating faster than said input shaft.

5. A transmission for transmitting torque from a drive shaft to a driven shaft including in combination, a hydrodynamic torque converter and a planetary gearing unit, said converter including an impeller driven by said drive shaft, first and second turbines and a reaction member, said gear unit including a planet carrier supporting first and second pinions in mesh with each other, a sun gear in mesh with said first planet pinion, a drive connection between said first turbine and said sun gear including a one-way clutch, a ring gear in mesh with said first planet pinion connected to drive said driven shaft, a sleeve shaft having a sun gear fixed thereto and in mesh with said second planet pinion, means for preventing rotation of said sleeve shaft in one direction and for permitting rotation of said sleeve shaft in the opposite direction including an engageable and releasable brake and a one-way brake, one-way brake means between said converter reaction member and said sleeve shaft for preventing reverse rotation of said converter reaction member with respect to the direction of rotation of said impeller, and a one-way clutch between said drive shaft and driven shaft constructed and arranged to permit said drive shaft to rotate faster than said driven shaft and to prevent said driven shaft from rotating faster than said drive shaft.

References Cited in the file of this patent
UNITED STATES PATENTS

| | | |
|---|---|---|
| 2,361,105 | Jandasek | Oct. 24, 1944 |
| 2,803,974 | Kelley | Aug. 27, 1957 |
| 2,820,373 | Dodge | Jan. 21, 1958 |